(12) United States Patent
Fan

(10) Patent No.: US 6,998,629 B2
(45) Date of Patent: Feb. 14, 2006

(54) RETICLE POSITION DETECTION SYSTEM

(75) Inventor: Ming-Yu Fan, Hsin-Chu (TW)

(73) Assignee: Taiwan Semiconductor Manufacturing Co Ltd, Hsin Chu (TW)

( * ) Notice: Subject to any disclaimer, the term of this patent is extended or adjusted under 35 U.S.C. 154(b) by 307 days.

(21) Appl. No.: 10/371,408

(22) Filed: Feb. 20, 2003

(65) Prior Publication Data

US 2004/0164256 A1    Aug. 26, 2004

(51) Int. Cl.
*G01V 8/00*    (2006.01)
*G01N 21/86*   (2006.01)

(52) U.S. Cl. .................... 250/559.29; 250/548; 355/53

(58) Field of Classification Search ................ 250/221, 250/222.1, 559.29, 559.3, 548; 356/125, 356/399–401; 355/53, 55
See application file for complete search history.

(56) References Cited

U.S. PATENT DOCUMENTS

| 6,356,616 | B1  |   | 3/2002  | Oshino |
| 6,479,201 | B2  | * | 11/2002 | Higashiki .................... 430/30 |
| 6,485,153 | B2  | * | 11/2002 | Ota ............................ 359/859 |
| 6,597,006 | B1  | * | 7/2003  | McCord et al. ........ 250/559.19 |
| 6,832,517 | B1  | * | 12/2004 | Kuo ............................ 73/293 |

\* cited by examiner

*Primary Examiner*—Stephone B. Allen
(74) *Attorney, Agent, or Firm*—R. W. Tung

(57) ABSTRACT

A reticle position detection system which detects an abnormal position of a reticle in order to prevent damage to the reticle by a reticle fork or pre-alignment unit used to orient the reticle for subsequent internalization into a process tool or other equipment. The reticle position detection system includes a laser beam generator provided on one side of the reticle and a laser beam sensor provided on the opposite side of the reticle. The laser beam generator emits a laser beam which is received by the laser beam sensor in the event that the reticle is correctly positioned for engagement by a reticle fork or pre-alignment unit.

20 Claims, 1 Drawing Sheet

RETICLE POSITION DETECTION SYSTEM

FIELD OF THE INVENTION

The present invention relates to reticles used in the formation of integrated circuit (IC) patterns or dies on semiconductor wafer substrates. More particularly, the present invention relates to a system for detecting or sensing the position of a reticle on a reticle pod to prevent damage to the reticle.

BACKGROUND OF THE INVENTION

The fabrication of various solid state devices requires the use of planar substrates, or semiconductor wafers, on which integrated circuits are fabricated. The final number, or yield, of functional integrated circuits on a wafer at the end of the IC fabrication process is of utmost importance to semiconductor manufacturers, and increasing the yield of circuits on the wafer is the main goal of semiconductor fabrication. After packaging, the circuits on the wafers are tested, wherein non-functional dies are marked using an inking process and the functional dies on the wafer are separated and sold. IC fabricators increase the yield of dies on a wafer by exploiting economies of scale. Over 1000 dies may be formed on a single wafer which measures from six to twelve inches in diameter.

Various processing steps are used to fabricate integrated circuits on a semiconductor wafer. These steps include deposition of a conducting layer on the silicon wafer substrate; formation of a photoresist or other mask such as titanium oxide or silicon oxide, in the form of the desired metal interconnection pattern, using standard lithographic or photolithographic techniques; subjecting the wafer substrate to a dry etching process to remove the conducting layer from the areas not covered by the mask, thereby etching the conducting layer in the form of the masked pattern on the substrate; removing or stripping the mask layer from the substrate typically using reactive plasma and chlorine gas, thereby exposing the top surface of the conductive interconnect layer; and cooling and drying the wafer substrate by applying water and nitrogen gas to the wafer substrate.

Photoresist materials are coated onto the surface of a wafer by dispensing a photoresist fluid typically on the center of the wafer as the wafer rotates at high speeds within a stationary bowl or coater cup. The coater cup catches excess fluids and particles ejected from the rotating wafer during application of the photoresist. The photoresist fluid dispensed onto the center of the wafer is spread outwardly toward the edges of the wafer by surface tension generated by the centrifugal force of the rotating wafer. This facilitates uniform application of the liquid photoresist on the entire surface of the wafer.

Spin coating of photoresist on wafers is carried out in an automated track system using wafer handling equipment which transport the wafers between the various photolithography operation stations, such as vapor prime resist spin coat, develop, baking and chilling stations. Robotic handling of the wafers minimizes particle generation and wafer damage. Automated wafer tracks enable various processing operations to be carried out simultaneously. Two types of automated track systems widely used in the industry are the TEL (Tokyo Electron Limited) track and the SVG (Silicon Valley Group) track.

The numerous processing steps outlined above are used to cumulatively apply multiple electrically conductive and insulative layers on the wafer and pattern the layers to form the circuits. The final yield of functional circuits on the wafer depends on proper application of each layer during the process steps. Proper application of those layers depends, in turn, on coating the material in a uniform spread over the surface of the wafer in an economical and efficient manner.

During the photolithography step of semiconductor production, light energy is applied through a reticle mask onto the photoresist material previously deposited on the wafer to define circuit patterns which will be etched in a subsequent processing step to define the circuits on the wafer. Because these circuit patterns on the photoresist represent a two-dimensional configuration of the circuit to be fabricated on the wafer, minimization of particle generation and uniform application of the photoresist material to the wafer are very important. By minimizing or eliminating particle generation during photoresist application, the resolution of the circuit patterns, as well as circuit pattern density, is increased.

A reticle is a transparent plate patterned with a circuit image to be formed in the photoresist coating on the wafer. A reticle contains the circuit pattern image for only a few of the die on a wafer, such as four die, for example, and thus, must be stepped and repeated across the entire surface of the wafer. In contrast, a photomask, or mask, includes the circuit pattern image for all of the die on a wafer and requires only one exposure to transfer the circuit pattern image for all of the dies to the wafer.

Reticles must remain meticulously clean for the creation of perfect images during its many exposures to pattern a circuit configuration on a substrate. The reticle may be easily damaged such as by dropping of the reticle, the formation of scratches on the reticle surface, electrostatic discharge (ESD), and particles. ESD can cause discharge of a small current through the chromium lines on the surface of the reticle, melting a circuit line and destroying the circuit pattern.

Reticles are transferred among various stations in a semiconductor fabrication facility in reticle pods, such as SMIF (standard mechanical interface) pods. SMIF pods are generally characterized by a pod door which mates with a pod shell to provide a sealed environment in which the reticles may be stored and transferred. In order to transfer reticles between a SMIF pod and a process tool in a fab, the pod is typically loaded either manually or automatically on a load port on the process tool. Once the pod is positioned on the load port, mechanisms in the port door unlatch the pod door from the pod shell such that the reticle may be transferred from within the pod into the process tool.

During transfer of a reticle between a pod and a process tool, it is desirable to minimize contact with the upper and lower surfaces of the reticle. Any such contact may generate particles and/or affect the pattern etched in the reticle. Any such contact may generate particles and/or affect the circuit pattern etched in the reticle. Accordingly, the engagement between the reticle and reticle forks for positioning the reticle must be minimal and precisely-controlled. It is therefore necessary to precisely position the reticle with respect to a reticle fork or other reticle gripping mechanism during transfer of the reticle.

FIGS. 1–3 show a reticle pod 12 which includes a pod shell 13 that contains a reticle 10. A removable pod door 14 seals the pod shell 13 and is supported on an indexer plate 20 of a process tool (not shown). The reticle 10 is secured to the pod door 14 typically by means of screws 18 that extend through screw openings (not shown) provided in the pod door 14 and are threaded through respective screw sleeves 16 and threaded into the reticle 10. The screw head 19 of each screw 18 is seated in a recess (not shown) in the pod door 14, and is normally flush with the bottom surface of the pod door 14. Prior to internalization of the reticle 10 into the mini-environment of the process tool, reticle-gripping members, such as reticle forks (not shown), engage and properly position the reticle 10 for internalization.

As shown in FIG. 1, the reticle 10 is normally disposed in a substantially horizontal plane prior to being gripped and positioned by the reticle-gripping members (not shown). This facilitates correct and precise contact between the reticle-gripping members and the reticle 10. However, as shown in FIG. 2, in some cases one of the screws 18 is incompletely threaded into the screw sleeve 16 that supports the reticle 10. This imparts a sloped or angled configuration to the reticle 10 such that improper contact between the reticle-gripping members and the reticle 10 occurs, causing potential damage to the reticle 10.

As shown in FIG. 3, another problem that sometimes occurs is that a particle or particles 22 inadvertently fall(s) on the indexing plate 20 prior to placement of the reticle pod 12 thereon. This may impart a tilting configuration to the pod door 14, and thus, the reticle 10, thereby causing improper contact between the reticle-gripping members and the reticle 10 and resulting in potential damage to the reticle 10. Accordingly, a reticle position detection system is needed for detecting or sensing the position of the reticle with respect to a horizontal plane prior to engagement of the reticle-gripping members with the reticle preparatory to positioning of the reticle for internalization into a processing tool.

An object of the present invention is to provide a reticle position detecting system which is capable of sensing or detecting a position of a reticle prior to internalization of the reticle into a process tool or other equipment.

Another object of the present invention is to provide a reticle position detecting system which is suitable for sensing or detecting a position of a reticle with respect to a horizontal plane to prevent damage to the reticle upon subsequent pre-positioning of the reticle for internalization into a process tool or other equipment.

Still another object of the present invention is to provide a reticle position detecting system which utilizes a laser beam to detect the relative position of a reticle in a reticle pod with respect to a plane.

Yet another object of the present invention is to provide a reticle position detecting system which includes a laser beam generator provided on one side of a reticle and a laser beam sensor provided on the opposite side of the reticle, wherein the laser beam generator emits a laser beam which is received or intercepted by the laser beam sensor in the event that the reticle pod is disposed in the correct position for engagement by a reticle fork or pre-alignment unit, and wherein the laser beam is reflected from the surface of the reticle and the laser beam sensor fails to receive or intercept the laser beam in the event that the reticle pod is disposed in the incorrect position for engagement by a reticle fork or pre-alignment unit.

SUMMARY OF THE INVENTION

In accordance with these and other objects and advantages, the present invention is generally directed to a reticle position detection system which detects an abnormal position of a reticle in order to prevent damage to the reticle by a reticle fork or pre-alignment unit used to orient the reticle for subsequent internalization into a process tool or other equipment. The reticle position detection system includes a laser beam generator provided on one side of the reticle and a laser beam sensor provided on the opposite side of the reticle. The laser beam generator emits a laser beam which is received by the laser beam sensor in the event that the reticle is correctly positioned for engagement by a reticle fork or pre-alignment unit. The laser beam is reflected from the surface of the reticle and clears the laser beam sensor in the event that the reticle is incorrectly positioned for engagement by the reticle fork or the pre-alignment unit.

In one embodiment of the invention, the laser beam generator and the laser beam sensor are mounted on elevated supports in such a manner that the laser beam emitted from the laser beam generator is reflected from the surface of the reticle at a first reflection point and then intercepted by the laser beam sensor in the event that the reticle is disposed in the correct position. In the event that the reticle is incorrectly-positioned, the laser beam is reflected from a second reflection point on the reticle and clears the laser beam sensor. In another embodiment of the invention, the laser beam generator and the laser beam sensor are mounted on level supports in such a manner that the emitted laser beam is nearly level with the surface of the reticle. In that case, the emitted laser beam travels in a straight path above the surface of the reticle and is received by the laser beam sensor in the event that the reticle is disposed in the correct position. Conversely, the laser beam strikes and is reflected from the surface of the reticle and received by the laser beam sensor in the event that the reticle is disposed in the incorrect position.

BRIEF DESCRIPTION OF THE DRAWINGS

The invention will now be described, by way of example, with reference to the accompanying drawings, in which.

DESCRIPTION OF THE PREFERRED EMBODIMENTS

The present invention has particularly beneficial utility in ascertaining whether a reticle is disposed in the correct position for engagement by a reticle fork or pre-alignment unit preparatory to internalization of the reticle into a process tool or other equipment in a semiconductor fabrication facility. However, the invention is not so limited in application, and while references may be made to such reticle, reticle fork, pre-alignment unit and process tool, it is understood that the present invention is more generally applicable to detecting or sensing the position of objects with respect to a plane in a variety of industrial and mechanical applications.

Figure 1:
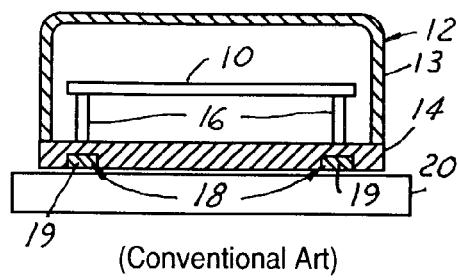
FIG. 1 is a cross-sectional view of a typical conventional reticle pod, with a reticle contained in the reticle pod and the reticle pod resting on an indexer plate, with the reticle disposed in the correct position for engagement by a reticle fork or pre-alignment unit.
Figure 2:
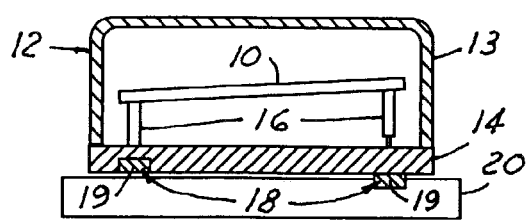
FIG. 2 is a cross-sectional view of a typical conventional reticle pod, with a reticle contained in the reticle pod and the reticle pod resting on an indexer plate, with the reticle disposed in an incorrect position for engagement by a reticle fork or pre-alignment unit due to an incompletely-set screw in the pod door.
Figure 3:
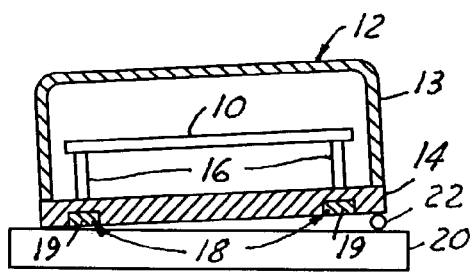
FIG. 3 is a cross-sectional view of a typical conventional reticle pod, with a reticle contained in the reticle pod and the reticle pod resting on an indexer plate, with the reticle disposed in an incorrect position for engagement by a reticle fork or pre-alignment unit due to a particle between the reticle pod and the indexer plate.
Figure 4:
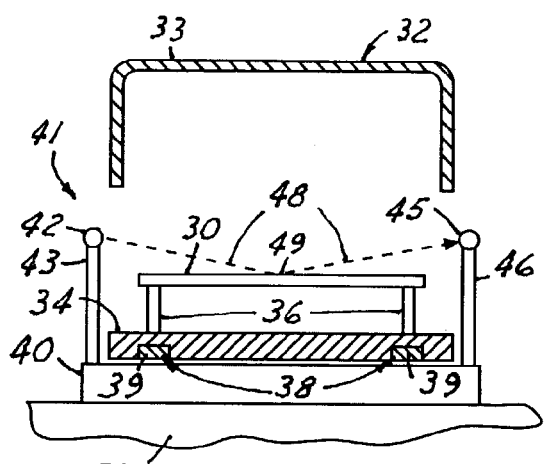
FIG. 4 is a cross-sectional view of a reticle pod in implementation of a first embodiment of the present invention, with a reticle contained in the reticle pod and the reticle pod resting on an indexer plate, with the reticle disposed in the correct position for engagement by a reticle fork or pre-alignment unit and a laser beam reflected from the reticle and received by a laser beam sensor to confirm the correct position of the reticle.
Figure 6:
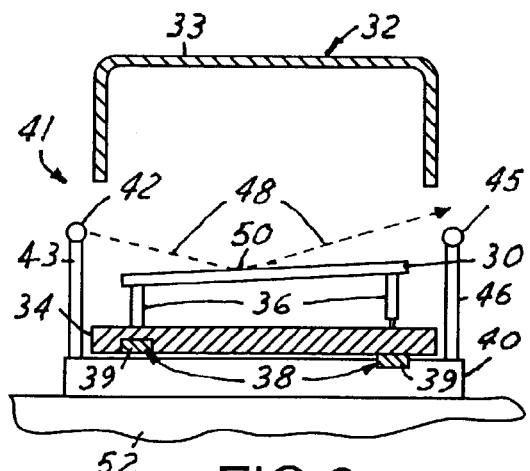
FIG. 6 is a cross-sectional view of a reticle pod in implementation of the first embodiment of the present invention shown in FIG. 4, with the reticle disposed in an incorrect position for engagement by a reticle fork or pre-alignment unit and a laser beam reflected from the surface of the reticle and clearing the laser beam sensor.
Figure 8:
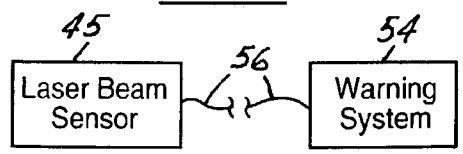
FIG. 8 is a schematic diagram illustrating a warning system operably connected to a laser beam sensor in implementation of the present invention.

Referring initially to FIGS. 4, 6 and 8, in one embodiment the reticle position detecting system of the present invention is generally indicated by reference numeral 41. The reticle position detecting system 41 is suitable for use in conjunction with a pod support surface 40 which initially supports a pod door 34 of a reticle pod 32 that contains a reticle 30 prior to internalization of the reticle 30 into a process tool 52, for example. The pod support surface 40 may be an indexer plate of the process tool 52 or an auto loader unit (ALU) on the process tool 52, for example. The system 41 includes an elevated generator support 43 which extends vertically upwardly from the pod support surface 40. A laser beam generator 42, which may be conventional, is provided on the upper end of the elevated generator support 43. An elevated sensor support 46 extends vertically upwardly from the pod support surface 40, in spaced-apart relationship to the elevated generator support 43. A laser beam sensor 45, which may be conventional, is provided on the upper end of the elevated sensor support 46. The elevated sensor support 46 is spaced from the elevated generator support 43 at a sufficient distance to facilitate placement of the reticle pod 32 there between as the reticle pod 32 is loaded onto the pod support surface 40, as hereinafter further described. The heights of the elevated generator support 43 and the elevated sensor support 46, respectively, are selected such that the laser beam generator 42 and the laser beam sensor 45, respectively, are disposed at a height of typically from about 2.0 cm to about 10 cm above the upper surface of the reticle 30 when the reticle pod 32 is provided on the pod support surface 40 as hereinafter described. As shown in FIG. 8, the laser beam sensor 45 may be connected to a suitable warning system 54 such as a computer, for example, typically through wiring 56.

In operation of the reticle position detecting system 41, a reticle pod 32, having a pod shell 33 removably attached to a bottom pod door 34, is initially loaded onto the pod support surface 40 of the process tool 52, between the elevated generator support 43 and the elevated sensor support 46. As shown in FIG. 4, a reticle 30, contained inside the pod shell 33, is normally attached to the pod door 34 using a pair of screws 38 that extend through respective screw openings (not shown) in the reticle pod door 34 and are threaded through respective screw sleeves 36 and into the reticle 30. The heads 39 of the respective screws 38 are normally seated in respective screw seats (not shown) recessed in the bottom surface of the pod door 34 and are flush or recessed with respect to the bottom surface of the pod door 34. Preparatory to internalization of the reticle 30 and pod door 34 into the process tool 52, a reticle fork or other pre-alignment unit (not shown) normally engages the reticle 30 for proper positioning of the reticle 30. When it is correctly positioned for engagement by the reticle fork or pre-alignment unit, as shown in FIG. 4, the reticle 30 is typically disposed in a generally horizontal plane. To verify such correct positioning of the reticle 30, the laser beam generator 42 emits a laser beam 48 which strikes and is reflected from the upper surface of the reticle 30 at a reflection point 49, and is intercepted by the laser beam sensor 45. Upon sensing the reflected light of the laser beam 48, the laser beam sensor 45 transmits an appropriate signal to the warning system 54, which indicates and confirms that the reticle 30 is in the correct position for engagement by the reticle fork or pre-alignment unit. Accordingly, pre-positioning of the reticle 30 can safely commence by subsequent engagement of the reticle fork or pre-alignment unit with the reticle 30 preparatory to internalization of the reticle 30 into the process tool or equipment.

As shown in FIG. 6, in the event that the reticle 30 is improperly disposed at an angled position with respect to a horizontal plane, such as may occur, for example, in the event that one of the screws 38 is incompletely threaded into the corresponding screw sleeve 36 or seated in the pod door 34, the laser beam 48 emitted by the laser beam generator 42 strikes and is reflected from the upper surface of the reticle 30 at a second reflection point 50, in which case the laser beam 48 is reflected above or on either side of the laser beam sensor 45, and thus, the laser beam sensor 45 fails to receive or intercept the reflected laser beam 48. Consequently, the warning system 54 fails to receive the appropriate signal indicating proper positioning of the reticle 30. Appropriate steps may then be taken to correct the position or orientation of the reticle 30 for safe engagement of the reticle 30 by the reticle fork or pre-alignment unit in order to avoid damage to the reticle 30.

Figure 5:
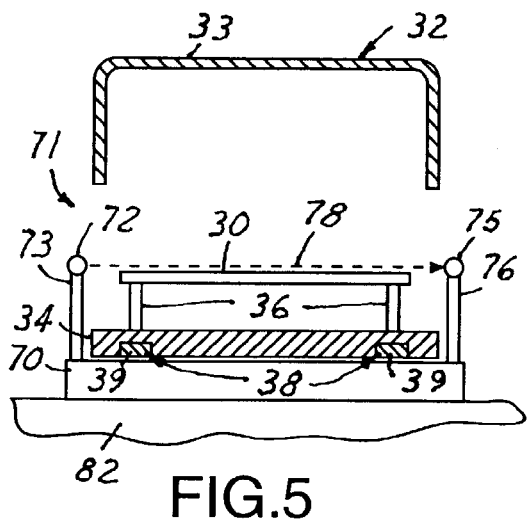
FIG. 5 is a cross-sectional view of a reticle pod in implementation of a second embodiment of the present invention, with a reticle contained in the reticle pod and the reticle pod resting on an indexer plate, with the reticle disposed in the correct position for engagement by a reticle fork or pre-alignment unit and a laser beam emitted above the surface of the reticle and received by a laser beam sensor to confirm the correct position of the reticle.
Figure 7:
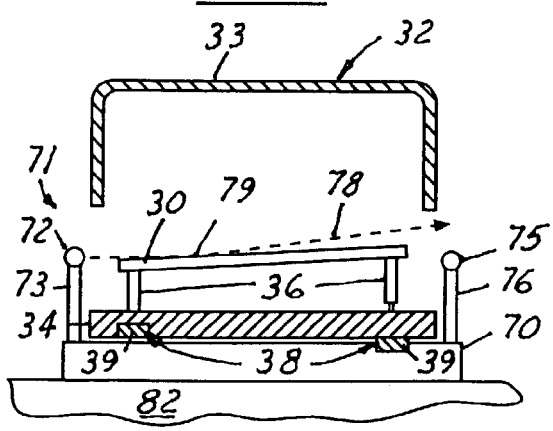
FIG. 7 is a cross-sectional view of a reticle pod in implementation of the second embodiment of the present invention shown in FIG. 5, with the reticle disposed in the incorrect position for engagement by a reticle fork or pre-alignment unit and a laser beam reflected from the surface of the reticle and clearing the laser beam sensor.

Referring next to FIGS. 5 and 7, in another embodiment the reticle position detecting system of the present invention is generally indicated by reference numeral 71 and is suitable for use in conjunction with a pod support surface 70 such as an indexer plate of a process tool 82 or an auto loader unit (ALU) on the process tool 82, for example. The system 71 includes a level generator support 73 which extends vertically upwardly from the pod support surface 70. A laser beam generator 72, which may be conventional, is provided on the upper end of the level generator support 73. A level sensor support 76 extends vertically upwardly from the pod support surface 70, in spaced-apart relationship to the level generator support 73. A laser beam sensor 75, which may be conventional, is provided on the upper end of the level sensor support 76. The level sensor support 76 is spaced from the level generator support 73 at a sufficient distance to facilitate placement of a reticle pod 32 there between as the reticle pod 32 is loaded onto the pod support surface 70. The heights of the level generator support 73 and the level sensor support 76, respectively, are selected such that the laser beam generator 72 and the laser beam sensor 75, respectively, are disposed at a height of typically from about 0.5 cm to about 2.0 cm above the upper surface of the reticle 30 when the reticle pod 32 is provided on the pod support surface 70 as hereinafter described. The laser beam sensor 75 may be connected to a suitable warning system 54 (FIG. 8) such as a computer, for example, typically through wiring 56.

In operation of the reticle position detecting system 71, the reticle pod 32 is initially loaded onto the pod support surface 70 of the process tool 82, between the level generator support 73 and the level sensor support 76. When it is correctly positioned as shown in FIG. 5 for engagement by the reticle fork or pre-alignment unit (not shown), the reticle 30 is typically disposed in a generally horizontal plane. Accordingly, the laser beam generator 72 emits a laser beam 78 in a straight horizontal path over the upper surface of the reticle 30, and the laser beam 78 is intercepted by the laser beam sensor 75. Upon sensing the incident light of the laser beam 78, the laser beam sensor 75 transmits an appropriate signal to the warning system 54, which indicates the correct position or orientation of the reticle 30. Accordingly, pre-positioning of the reticle 30 can safely commence by subsequent engagement of the reticle fork or pre-alignment unit with the reticle 30 preparatory to internalization of the reticle 30 into the process tool or equipment.

As shown in FIG. 7, in the event that the reticle 30 is improperly disposed at an angled position with respect to a horizontal plane, as heretofore described with respect to the system 41 of FIG. 6, the laser beam 78 emitted by the laser beam generator 72 strikes and is reflected from the upper surface of the reticle 30 at a reflection point 79, in which case the laser beam 78 is reflected above or on either side of the laser beam sensor 75, and thus, the laser beam sensor 75 fails to receive or intercept the reflected laser beam 78. Consequently, the warning system 54 fails to receive the appropriate signal indicating proper positioning of the reticle 30. Appropriate steps may then be taken to correct the position or orientation of the reticle 30 for safe engagement of the reticle 30 by the reticle fork or pre-alignment unit in order to avoid damage to the reticle 30.

While the preferred embodiments of the invention have been described, it will be recognized and understood that various modifications can be made in the invention and the appended claims are intended to cover all such modifications which may fall within the spirit and scope of the invention.

What is claimed is:

1. A system for detecting a position of a reticle with respect to a plane, comprising:
    a laser beam generator and a laser beam sensor provided in spaced-apart relationship to each other for receiving the reticle therebetween; and
    wherein said laser beam generator is adapted for emitting a laser beam for interception by said laser beam sensor when the reticle is disposed in the plane and for reflection from the reticle and missing said laser beam sensor when the reticle deviates from the plane.

2. The system of claim 1 further comprising an elevated sensor support for supporting said laser beam sensor in an elevated position with respect to the reticle and an elevated generator support for supporting said laser beam generator in an elevated position with respect to the reticle.

3. The system of claim 2 wherein said elevated sensor support and said elevated generator support are adapted for supporting said laser beam sensor and said laser beam generator, respectively, at a height of from about 2 cm to about 10 cm above the reticle.

4. The system of claim 1 further comprising a level sensor support for supporting said laser beam sensor at a generally level position with respect to the reticle and a level generator support for supporting said laser beam generator at a generally level position with respect to the reticle.

5. The system of claim 4 wherein said level sensor support and said level generator support are adapted for supporting said laser beam sensor and said laser beam generator, respectively, at a height of from about 0.5 cm to about 2 cm above the reticle.

6. A system for detecting a position of a reticle in a reticle pod with respect to a plane, comprising:
    a pod support surface for receiving the reticle pod;
    a laser beam sensor carried by said pod support surface;
    a laser beam generator carried by said pod support surface in spaced-apart relationship to said laser beam sensor, with the pod support surface adapted for receiving the reticle pod between said laser beam sensor and said laser beam generator;
    wherein said laser beam generator is adapted for generating a laser beam for interception by said laser beam sensor when the reticle is disposed in the plane and reflection from the reticle and missing said laser beam sensor when the reticle deviates from the plane; and
    a warning system connected to said laser beam sensor for indicating deviation of the reticle from the plane.

7. The system of claim 6 further comprising an elevated sensor support carried by said pod support surface for supporting said laser beam sensor in an elevated position with respect to the reticle and an elevated generator support carried by said pod support surface for supporting said laser beam generator in an elevated position with respect to the reticle.

8. The system of claim 7 wherein said pod support surface comprises an indexer plate of a process tool.

9. The system of claim 7 wherein said pod support surface comprises an auto-loading unit of a process tool.

10. The system of claim 7 wherein said elevated sensor support and said elevated generator support are adapted for supporting said laser sensor and said laser generator, respectively, at a height of from about 2 cm to about 10 cm above the reticle.

11. The system of claim 6 further comprising a level sensor support carried by said reticle support surface for supporting said laser sensor at a generally level position with respect to the reticle and a level generator support carried by said reticle support surface for supporting said laser generator at a generally level position with respect to the reticle.

12. The system of claim 11 wherein said level sensor support and said level generator support are adapted for supporting said laser sensor and said laser generator, respectively, at a height of from about 0.5 cm to about 2 cm above the reticle.

13. A method of detecting a position of a reticle in a reticle pod with respect to a plane, comprising the steps of:
    providing a pod support surface;
    providing a laser beam generator on said pod support surface;
    providing a laser beam sensor on said pod support surface in spaced-apart relationship to said laser beam generator;
    placing the reticle pod on said pod support surface between said laser beam generator and said laser beam sensor;

emitting a laser beam from said laser beam generator to said laser beam sensor when the reticle is disposed in the plane; and reflecting the laser beam from the reticle away from said laser beam sensor when the reticle deviates from the plane.

14. The method of claim 13 wherein said emitting a laser beam from said laser beam generator to said laser beam sensor comprises the step of reflecting the laser beam from the reticle to said laser beam sensor.

15. The method of claim 13 wherein said emitting a laser beam from said laser beam generator to said laser beam sensor comprises the step of emitting the laser beam from said laser beam generator, over the reticle in a substantially straight, non-reflective path to said laser beam sensor.

16. The method of claim 13 wherein said pod support surface comprises an indexer plate of a process tool.

17. The method of claim 13 wherein said pod support surface comprises an auto load unit of a process tool.

18. The method of claim 14 wherein said providing a laser beam sensor on said pod support surface comprises the step of providing an elevated sensor support on said pod support surface and providing said laser beam sensor on said elevated sensor support and wherein said providing a laser beam generator on said pod support surface comprises the step of providing an elevated generator support on said pod support surface and said laser beam generator on said elevated generator support.

19. The method of claim 15 wherein said providing a laser beam sensor on said pod support surface comprises the step of providing a level sensor support on said pod support surface and providing said laser beam sensor on said level sensor support and wherein said providing a laser beam generator on said pod support surface comprises the step of providing a level generator support on said pod support surface and said laser beam generator on said level generator support.

20. The method of claim 13 wherein said plane comprises a generally horizontal plane.

* * * * *